(12) United States Patent
Masuda

(10) Patent No.: US 6,705,639 B2
(45) Date of Patent: Mar. 16, 2004

(54) HEAD-PROTECTION BAG FOR VEHICLE OCCUPANTS

(75) Inventor: Yasushi Masuda, Tokyo (JP)

(73) Assignee: Takata Corporation, Tokyo (JP)

( * ) Notice: Subject to any disclaimer, the term of this patent is extended or adjusted under 35 U.S.C. 154(b) by 120 days.

(21) Appl. No.: 09/794,153

(22) Filed: Feb. 28, 2001

(65) Prior Publication Data

US 2001/0022443 A1 Sep. 20, 2001

Related U.S. Application Data

(60) Provisional application No. 60/209,637, filed on Jun. 6, 2000, and provisional application No. 60/186,675, filed on Mar. 3, 2000.

(51) Int. Cl.⁷ .............................................. B60R 21/22
(52) U.S. Cl. ............................... 280/730.2; 280/743.1; 280/749
(58) Field of Search .......................... 280/743.1, 730.2, 280/7.49, 739

(56) References Cited

U.S. PATENT DOCUMENTS

| | | | | |
|---|---|---|---|---|
| 5,529,337 A | * | 6/1996 | Takeda et al. ............... 280/729 |
| 5,722,685 A | * | 3/1998 | Eyrainer ..................... 280/729 |
| 5,788,270 A | * | 8/1998 | HÅland et al. .............. 280/729 |
| 5,865,462 A | * | 2/1999 | Robins et al. ............ 280/730.2 |
| 5,884,937 A | * | 3/1999 | Yamada ..................... 280/730.2 |
| 5,941,564 A | * | 8/1999 | Acker ....................... 280/743.2 |
| 6,056,316 A | * | 5/2000 | Yamaji et al. ............. 280/730.1 |
| 6,073,961 A | * | 6/2000 | Bailey et al. ................ 280/729 |
| 6,129,377 A | * | 10/2000 | Okumura et al. ......... 280/730.2 |
| 6,135,493 A | * | 10/2000 | Jost et al. ................. 280/730.2 |
| 6,152,481 A | * | 11/2000 | Webber et al. ............ 280/728.2 |
| 6,152,485 A | * | 11/2000 | Kato ......................... 280/728.2 |
| 6,155,596 A | * | 12/2000 | Nakajima et al. ......... 280/730.2 |
| 6,168,191 B1 | * | 1/2001 | Webber et al. ........... 280/730.2 |
| 6,170,860 B1 | | 1/2001 | Denz et al. |
| 6,199,898 B1 | * | 3/2001 | Masuda et al. ............. 280/729 |
| 6,203,058 B1 | * | 3/2001 | Elqadah et al. .......... 280/730.2 |
| 6,220,625 B1 | * | 4/2001 | Wallner et al. ............. 280/729 |
| 6,224,101 B1 | * | 5/2001 | Nishijima et al. ........ 280/743.2 |
| 6,231,073 B1 | * | 5/2001 | White, Jr. ................. 280/730.2 |
| 6,237,939 B1 | * | 5/2001 | Resh ....................... 280/730.2 |
| 6,250,667 B1 | * | 6/2001 | Wallner ...................... 280/729 |
| 6,361,071 B1 | * | 3/2002 | Denz et al. ................. 280/739 |
| 6,375,216 B1 | | 4/2002 | Eschbach |
| 6,386,578 B1 | * | 5/2002 | Nanbu et al. ............. 280/730.2 |
| 6,450,527 B2 | * | 9/2002 | Kobayashi et al. ......... 280/729 |

FOREIGN PATENT DOCUMENTS

| | | |
|---|---|---|
| DE | 297 09 389 U1 | 5/1997 |
| DE | 299 07 912 U1 | 5/1999 |
| DE | 199 39 339 A1 | 2/2000 |
| JP | H10-291457 | 4/1998 |

* cited by examiner

*Primary Examiner*—Paul N. Dickson
*Assistant Examiner*—Deanna Draper
(74) *Attorney, Agent, or Firm*—Foley & Lardner

(57) ABSTRACT

A head-protection bag in which stress to be applied to circular connected portions during the inflation of the bag can be absorbed so as to prevent gas leakage at the circular connected portions is provided. The head-protection bag includes a window-side sheet, a cabin-side sheet, and a chamber which is formed between the sheets and by superposing the sheets on each other and sewing the sheets together. The sheets are connected to each other by line-shaped connected portions extending around their peripheries, line-shaped connected portions for subdividing the chamber, and circular connected portions for reinforcing areas around ends of the line-shaped connected portions. Each of the circular connected portions has a circular opening formed at the center thereof by cutting out the sheets.

8 Claims, 4 Drawing Sheets

HEAD-PROTECTION BAG FOR VEHICLE OCCUPANTS

CROSS REFERENCE TO RELATED APPLICATIONS

The present application claims priority to and the benefit of the following U.S. Provisional Patent Applications:

Ser. No. 60/186,675 filed Mar. 3, 2000; and

Ser. No. 60/209,637 filed Jun. 6, 2000

The foregoing provisional applications are incorporated by reference herein in their entirety.

BACKGROUND OF THE INVENTION

The present invention relates to a head-protection bag for vehicle occupants. More particularly, the invention relates to a bag which is inflated to expand over windows of doors and the B-pillar of the vehicle in the event of side collision or roll-over. In detail, the present invention relates to a head-protection bag for vehicle occupants comprising two sheets which are superposed on each other and interconnected by line-shaped connected portions and circular connected portions.

As one of the head-protection bag, there is a so-called "curtain bag" which is inflated to expand over windows of doors and a B-pillar in the event of side collision or roll-over. In one such head-protection bag disclosed in Japanese Patent Unexamined Publication H10-291457, two sheets are superposed on each other and sewn together around their peripheries by seams of sewing yarn to form a chamber into which gas is supplied and filled.

To prevent the chamber from being inflated too thick, the two sheets are connected to each other by line-shaped connected portions. It has been found that stress concentration occurs at ends of the line-shaped connected portions. Thus, the ends of the connected portions are sewn into a circular form (circular connected portions) to disperse the stress. In this head-protection bag, large stress is applied to the seams on the circular connected portions. Therefore, it is an object of the present invention to provide a head-protection bag that absorbs the stress to be applied to the circular connected portions.

In addition, in this conventional design, air is sometimes entrapped in sealed portions of circular connected portions during the manufacturing process and thus increases the volume of a bag. The areas including the entrapped air can be stressed when the bag is folded. Therefore, it is another object of the present invention to provide a head-protection bag that does not include entrapped air.

SUMMARY OF THE INVENTION

A head-protection bag for vehicle occupants of the present invention is a bag which is disposed along a corner between a ceiling and a side of a vehicle cabin and is inflated with gas to expand downwardly along the side, comprises two sheets which are superposed on each other and are sewn together along their peripheries by line-shaped connected portions, and is characterized in that parts of the sheets are connected by circular connected portions; and that the circular connected portions are each formed at its center with an opening penetrating both of the sheets.

According to the aforementioned head-protection bag, when large stress is applied to the circular connected portions in the longitudinal direction of the bag during the inflation of the bag, areas including the circular connected portions are elongated in the direction of the stress because of the openings formed in the circular connected portions. Therefore, the stress to be applied to the circular connected portions can be absorbed.

As described above, conventionally, air is sometimes entrapped in sealed portions of circular connected portions during the manufacturing process and thus increases the volume of a bag. Also in this case, areas including the entrapped air can be stressed when the bag is folded. In the head-protection bag of the present invention, air can escape from sealed portions whereby no air is entrapped.

The present invention provides several alternatives for preventing gas from being entrapped in sealed portions. For example, when a sealing layer is formed between the sheets at the circular connected portion it may be bonded to the respective sheets. As a result, separation of the sealing layer from the sheets can be prevented because the stress is absorbed. In addition, when the sheets are connected by seams, the seams can be prevented from stretched, thus preventing gas from leaking through the stretched seams into the sealed portions.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
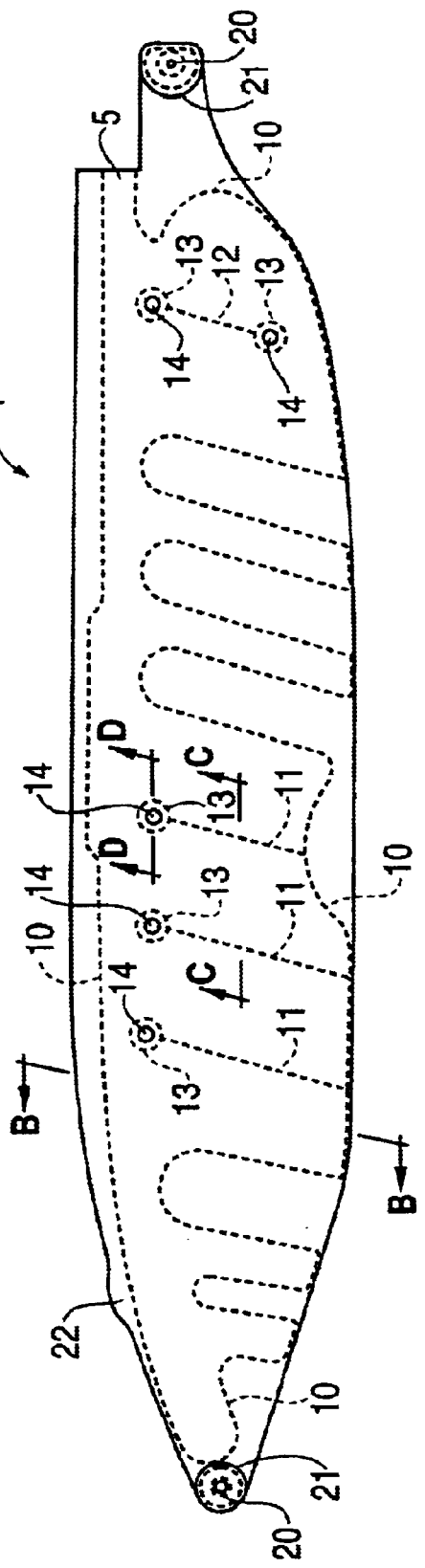
FIGS. 1(a)–1(d) are structural views of a head-protection bag according to an embodiment of the present invention.
Figure 1D:
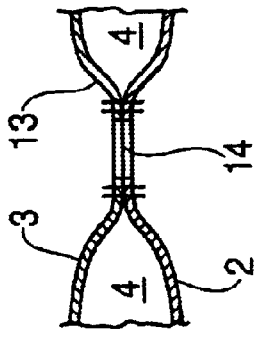
Figure 1C:
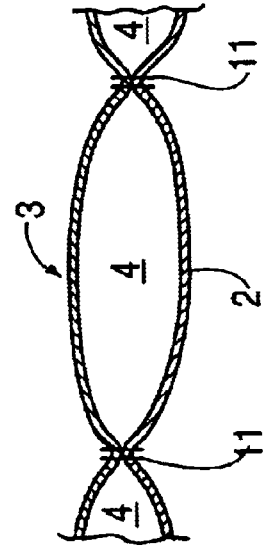
Figure 1B:
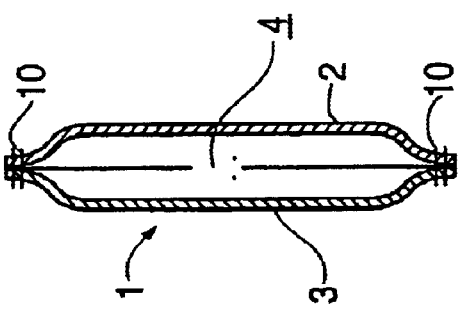
Figure 2:
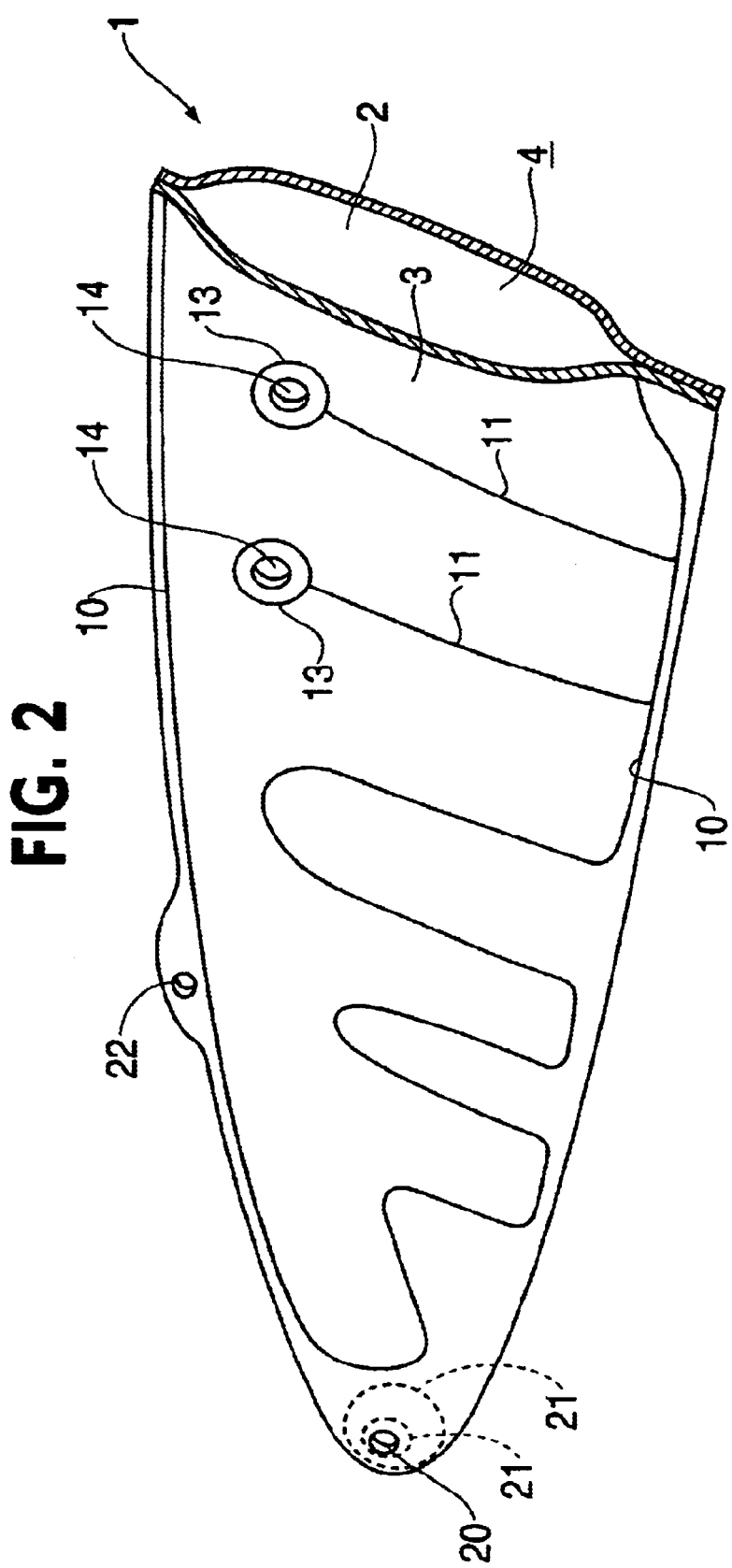
FIG. 2 is a perspective view of the head-protection bag shown in FIG. 1(a) when inflated.
Figure 3A:
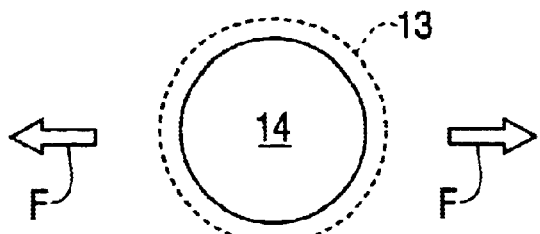
FIGS. 3(a), 3(b) are front views showing an area including a circular connected portion of the bag shown in FIG. 1(a) when the bag is inflated.
Figure 3B:
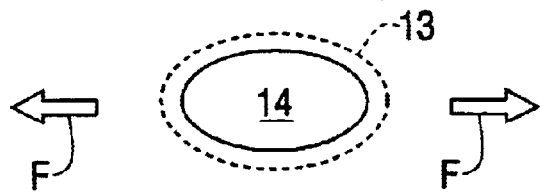
Figure 4:
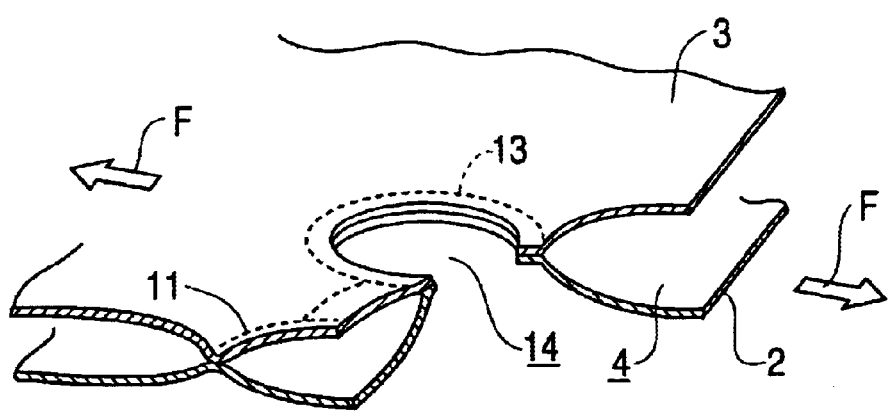
FIG. 4 is a perspective sectional view showing the area including the circular connected portion of the bag shown in FIG. 1(a) when the bag is inflated.

Hereinafter, embodiments will be described with reference to the attached drawings. FIGS. 1(a)-4 show a head-protection bag 1 for vehicle occupants according to an embodiment of the present invention. FIG. 1(a) is a front view of the head-protection bag 1, FIGS. 1(b)–1(d) are sectional views taken along lines B—B through D—D, respectively, FIG. 2 is a perspective view of the head-protection bag when inflated, and FIGS. 3(a), 3(b) and 4 are structural views showing an area including a circular connected portion when inflated.

The head-protection bag 1 according to the present invention comprises a window-side sheet 2, a cabin-side sheet 3, and a chamber 4 which is formed between the sheets 2 and 3 by superposing the sheets 2, 3 on each other and sewing the sheets 2, 3 together. The sheets 2, 3 may be separate from each other or may be an integral sheet which is folded to be superposed on each other.

The sheets 2, 3 are connected to each other by line-shaped connected portions 10 that extending around the peripheries of the sheets, with some parts of the connected portions 10 extending toward the center of the sheets 2, 3, as shown in FIGS. 1(a) and 2. The bag 1 may include line-shaped connected portions 11, 12 for subdividing the chamber 4, and circular connected portions 13 for reinforcing areas around ends of the line-shaped connected portions 11, 12. As shown in FIG. 4, each of the circular connected portions 13 has a circular opening 14 formed at the center thereof by cutting out the sheets 2, 3.

Generally, the bag 1 extends along the side of the vehicle cabin in the longitudinal direction of the vehicle and is formed at the front end and the rear end in the longitudinal direction thereof with holes 20 for installation to the vehicle body and also near the upper edge thereof with a hole 22 for installation to the vehicle body. Seams 21 are formed around the respective holes 20.

Though a gas inlet 5 through which gas from an inflator (not shown) is introduced is formed at the front end or the rear end of the bag 1, the position of the gas inlet 5 is not limited thereto. The inflator may be disposed inside the bag.

It should be noted that the lower ends of the line-shaped connected portions 11 continue to the line-shaped connected portions 10 extending along the lower edge of the bag and the upper ends of the line-shaped connected portions 11 do not reach the line-shaped connected portion 10 extending along the upper edge of the bag. The upper ends of the line-shaped connected portions 11 continue to the circular connected portions 13, as shown in FIG. 2.

The upper and lower ends of the line-shaped connected portion 12 both separate from the line-shaped connected portions 10 extending along the upper edge and the lower edge of the bag and both continue to the circular connected portions 13, respectively. The line-shaped connected portions 11, 12 prevent the chamber 4 from being inflated too thick. The circular connected portions 13 reinforce the ends of the line-shaped connected portions 11, 12.

For example, the bag 1 is installed in such a manner that the front end is fixed to an A-pillar of the vehicle and the rear end is fixed to a C-pillar. The bag 1 is installed in a state that a front portion of the bag 1 is folded along an upper portion of the A-pillar, a middle portion of the bag 1 is folded along a roof side rail, and a rear portion of the bag 1 is folded along an upper portion of the C-pillar. It should be noted that another arrangement or installation may be employed.

The folded bag 1 is covered by a cover (not shown). The cover is adapted to be torn or opened when the bag 1 is inflated. As the vehicle suffers a side collision or roll-over, the inflator (not shown) is actuated, gas flows into the chamber 4 through the gas inlet 5 so that the bag 1 is inflated and deployed downwardly, thereby protecting the heads of occupants.

Since the holes 20 at the front and rear ends of the bag 1 are fixed to the vehicle body, a large tension is developed on the sheet 2, 3 in the longitudinal direction of the vehicle when the chamber 4 of the bag is inflated so that the bag 1 tends to be shortened in the longitudinal direction. During this inflation, stress is applied to the connected portions 10, 11, 12, 13 so as to separate the sheets 2, 3 from each other. In particular, significantly large stress is exerted from the sheets 2, 3 facing the chamber 4 to the areas about the circular connected portions 13.

In this embodiment, since the circular opening 14 is formed inside each circular connected portion 13, the circular connected portion 13 extends in such a manner that the opening 14 is deformed from its circular shape to an oval shape as shown in FIGS. 3(a), 3(b) when stress F in the longitudinal direction is applied to the area including the circular connected portion 13. Therefore, the stress in the longitudinal direction of the vehicle to be applied to the area including the circular connected portion 13 can be absorbed. As a result of this, the stress to be applied to the seams at the circular connected portion 13 is absorbed, thereby preventing the seams from being stretched and preventing gas from leaking through the stretched seams.

Even when a sealing layer is interposed between the sheets 2, 3 at and around each circular connected portion 13 such that the sealing layer is bonded to the sheets 2, 3, the stress to be applied to separate the sealing layer from the sheets 2, 3 can be absorbed. Therefore, the separation of the sealing layer can be prevented, thereby securely preventing the gas leakage.

Because it is preferable that the inner pressure in a head-protection bag of this type can be kept high for a long period of time, the prevention of the gas leakage through the seams is extremely advantageous.

Figure 5:
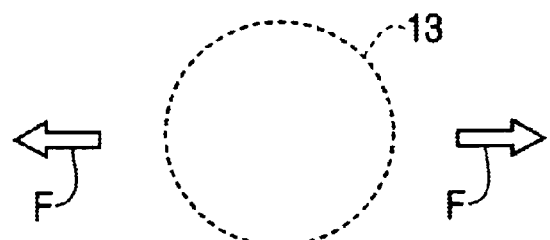
FIG. 5 is a front view of a circular connected portion as a comparative example.

In the case where no opening is provided inside a circular connected portion 13' as shown in FIG. 5, an area including the circular connected portion 13' does not extend even when stress F is applied to the area including the circular connected portion 13' so that significantly large stress is exerted to the seams at the circular connected portion 13'.

According to the present invention, the openings 14 can be utilized as positioning holes (location holes) for sewing together the sheets 2, 3.

Figure 6A:
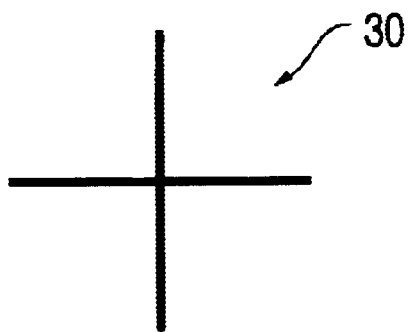
FIGS. 6(a)–6(c) are plan views of the shape of the opening in the airbag.
Figure 6B:
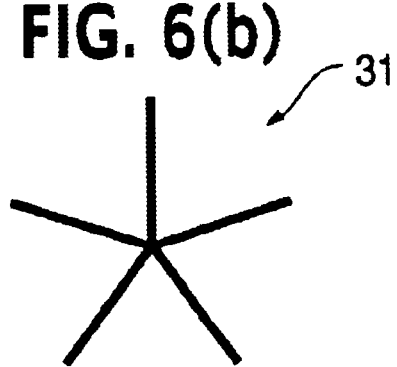
Figure 6C:
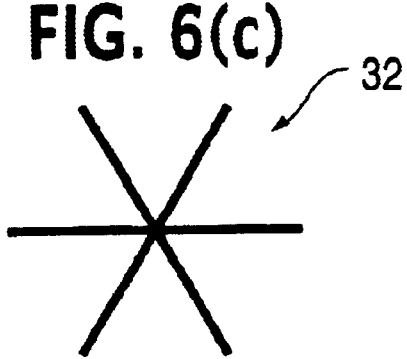

Further, in an alternative embodiment of the present invention, the opening 14 may take another shape. For example, the opening may be in the shape of an oval, triangular, or a polygon such as a square and a pentagon. Alternatively, the opening may be a slit. FIGS. 6(a)–(c) disclose examples of several different slit designs. FIG. 6(a) shows a cross-shaped slit 30 that extends in four directions. FIG. 6(b) shows a star-shaped slit 31 that extends in five directions. FIG. 6(c) shows a slit 32 that extends in six directions. The slit is not limited to these embodiments and could be designed in any other configurations.

As apparent from the above description, according to the present invention, the stress to be applied to areas including circular connected portions of a head-protection bag can be absorbed, thereby preventing gas leakage at the circular connected portions. The openings at the centers of the circular connected portions can be utilized as location holes during the manufacturing process. As mentioned above, conventionally, air is sometimes entrapped in sealed portions of circular connected portions during the manufacturing process and thus increases the volume of a bag. Also in this case, areas including the entrapped air should be stressed when the bag is folded. In the head-protection bag of the present invention, air can escape from the sealed portions whereby no air is entrapped.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

I claim:

1. A head-protection bag for vehicle occupants which is disposed along a corner between a ceiling and a side of a vehicle cabin and is inflated with gas to expand downwardly along the side, said head-protection bag comprising:

a pair of sheets which are superposed on each other and are sewn together generally along their peripheries by line-shaped connected portions;

wherein said pair of sheets are connected together at a circular connected portion surrounding an opening through each sheet of the pair of sheets; wherein the opening is isolated from the airbag so that when the airbag is inflated inflation gas does not pass through the opening.

2. The head-protection bag of claim 1, wherein said opening is in the shape of a circle when the bag is uninflated.

3. The head-protection bag of claim 1, wherein the circular connected portion comprises sewing yarn.

4. The head-protection bag of claim 3, wherein the circular connected portion further comprises a sealing layer disposed between the pair of sheets.

5. An inflatable bag for protecting the head of an occupant of a vehicle comprising:

a pair of sheets sewn together to form a chamber for receiving an inflation gas;

a circular connected portion surrounded by the chamber, wherein the pair of sheets are connected together at the connected portion to form an opening sealed off from the chamber so that inflation gas does not pass through the opening;

wherein the opening extends through each sheet.

6. The inflatable bag of claim 5, wherein the opening is in the shape of a circle when the bag is in an uninflated shape.

7. The inflatable bag of claim 5, wherein the opening comprises a slit.

8. The inflatable bag of claim 7, wherein the slit is in the shape of a cross.

* * * * *